United States Patent [19]

Höhne

[11] 4,326,914

[45] Apr. 27, 1982

[54] DIAPHRAGMS FOR ELECTROCHEMICAL CELLS AND THE MANUFACTURE THEREOF

[75] Inventor: Karl Höhne, Erlangen, Fed. Rep. of Germany

[73] Assignee: Siemens Aktiengesellschaft, Berlin and Munich, Fed. Rep. of Germany

[21] Appl. No.: 185,431

[22] Filed: Sep. 9, 1980

[30] Foreign Application Priority Data

Sep. 20, 1979 [DE] Fed. Rep. of Germany ....... 2938123

[51] Int. Cl.³ .............................................. C25B 13/00
[52] U.S. Cl. .................................... 162/105; 162/106; 162/108; 162/138; 162/152; 162/169; 204/295; 204/296; 428/444
[58] Field of Search ............... 162/105, 106, 138, 152, 162/181 A, 169, 145, 181 R, 168, 108; 204/295, 296; 428/444

[56] References Cited

U.S. PATENT DOCUMENTS

| | | | |
|---|---|---|---|
| 3,583,891 | 6/1971 | Hacker et al. | 162/169 |
| 4,126,535 | 11/1978 | Balko et al. | 204/296 |
| 4,126,536 | 11/1978 | Balko et al. | 204/296 |

*Primary Examiner*—Peter Chin
*Attorney, Agent, or Firm*—Kenyon & Kenyon

[57] ABSTRACT

The invention relates to a method for the manufacture of diaphragms of fibrous potassium titanate and an organic binder for electrochemical cells and has as the object to develop such a method in such a direction that it allows the manufacture of diaphragms which are relatively thin but have, at the same time, a sufficient long-term chemical and mechanical stability at high operating temperatures. According to the invention, provision is made for this purpose to apply potassium titanate, together with polytetrafluoroethylene and a styrene-butadiene copolymer, from a suspension, to a screen with a mesh width between about 0.1 and 0.4 mm. The diaphragms made by the method according to the invention are suitable particularly as cover layers in fuel cells with an alkaline electrolyte.

7 Claims, No Drawings

DIAPHRAGMS FOR ELECTROCHEMICAL CELLS AND THE MANUFACTURE THEREOF

BACKGROUND OF THE INVENTION

The present invention relates to a method for the manufacture of diaphragms of fibrous material and an organic binder for electrochemical cells, as well as to diaphragms made according to such a method.

Diaphragms for electrochemical cells, in addition to possessing sufficient porosity and good chemical resistance to the media used, also must have high mechanical strength. Accordingly, it is known to use in fuel cells, for example, diaphragms comprised of high-purity asbestos fibers and a plastic material, in which the plastic material is a binder of methacrylic-acid ester, polysulfones, chlorosulfonated polyethylene or chloroprene in amounts of 0.5 to 6% by weight, particularly 1.5 to 3% by weight, referred to the weight of the asbestos fibers (British Pat. No. 1,213,472). In the preparation of the asbestos diaphragms, the plastic is added to the asbestos fibers in the form of an aqueous dispersion.

U.S. Pat. No. 3,583,891 describes a method for the manufacture of a gas-tight diaphragm of high mechanical strength for use in electrochemical cells, particularly fuel cells. The diaphragm consists of fibrous asbestos or carbon material and a plastic binder, in which a butadiene-styreneacrylonitrile copolymerizate is added to the fiber material when the diaphragm of the latter is made (copolymerizate content of 6 to 15% by weight as referred to the fiber material), and where, after the diaphragm is formed, the nitrile groups of the copolymerizate are saponified into carboxyl groups.

The requirements for the diaphragms with respect to their chemical and mechanical stability become more stringent when higher operating temperatures are employed, which is due to oxygen and electrolytic liquid. An additional aggravating circumstance is the relatively high operating gas pressure.

Asbestos diaphragms have found acceptance, for example, in $H_2/O_2$ fuel cells with an alkaline electrolyte. However, at operating temperatures above 80° C., the asbestos material gives off substantial quantities of silicates to the electrolytic liquid, which lower the activity of the Raney nickel used as the anode catalyst. In addition, the diaphragms suffer a loss of mechanical strength due to the attack by the electrolytic liquid. This can be compensated only in part through the use of thick diaphragms having a high binder content. Additionally these diaphragms possess other detrimental properties.

SUMMARY OF THE INVENTION

It is an object of the present invention to develop a method of the type mentioned at the outset in such a manner that it permits the manufacture for electrochemical cells of diaphragms which are relatively thin but have, at the same time, sufficient chemical and mechanical stability over extended periods of time at high operating temperatures.

According to the present invention, this and other objects are achieved by the provision that potassium titanate, together with polytetrafluoroethylene and a styrene-butadiene copolymer, is applied from a suspension to a screen with a mesh width of between about 0.1 and 0.4 mm.

By means of the method according to the present invention, utilizing potassium titanate, thin, gas-tight, chemically and mechanically stable diaphragms can be produced in a reproducible manner. However, it is essential that the potassium titanate is deposited, together with a special binder, on a screen with a definite mesh width. It has been found that gas-tight diaphragms cannot be produced from potassium titanate alone or from potassium titanate and one of the conventional binders such as polytetrafluoroethylene. Potassium titanate, which is alkali-resistant, is chemically represented substantially as $K_2Ti_6O_{13}$.

With a potassium titanate coating of 19 mg/cm$^2$, the thickness of a diaphragm made by the method according to the present invention is, for example, only 0.4 mm including the support screen. The potassium titanate layer is anchored therein firmly with the screen and is very stable. Even when folded, no cracks develop. The fact that diaphragms of such mechanical stability can be made of potassium titanate is rather surprising. While potassium titanate does have a fiber structure, as has asbestos, potassium titanate consists of smooth and very short needles, as opposed to asbestos, which has a more feathery structure.

A screen with a mesh width of about 0.2 mm is preferably employed in the method according to the present invention. The screens used consist of alkali-resistant material, preferably, alkali-resistant plastic and metals, particularly nickel.

The diaphragms according to the present invention generally have a binder content of between about 10 and 30% by weight, referred to the potassium titanate, preferably, between about 15 and 25% by weight. The binder itself consists advantageously of 30 to 60% by weight polytetrafluoroethylene and 40 to 70% by weight styrene-butadiene copolymer, the two components adding up to 100%. The potassium titanate coating density of the diaphragms according to the invention is advantageously between about 10 and 30 mg/cm$^2$ and preferably between about 15 and 25 mg/cm$^2$.

DETAILED DESCRIPTION OF THE INVENTION

The invention is explained in greater detail with the aid of the following, non-limiting examples.

EXAMPLE I

Preparation of Diaphragms 2 g potassium titanate are stirred in 300 ml water and 0.29 g of an aqueous 60% suspension of polytetrafluoroethylene (PTFE), and 0.4 g of an aqueous 43.5% suspension of a styrene-butadiene copolymer (SB) are added thereto. The suspension so obtained is poured into a suction filter (diameter, 11 cm), on the sieve bottom of which was placed a filter paper and thereon a nickel screen with a wire diameter of 0.125 mm and a mesh width of 0.2 mm. After being suctioned off, the nickel screen together with the filter cake is dried in a photo press. The dried diaphragm is subsequently pressed at 150° C. and a pressure of 500 N/cm$^2$.

EXAMPLE II

Determination of the So-Called "Bubble Point"

To determine the gas-tightness of the diaphragms, a hollow body provided with an opening and a gas inlet tube is used, the opening of which is closed off by a diaphragm. The diaphragm is supported toward the outside by a perforated plate. The entire arrangement is immersed in a beaker filled with water and, after a dwelling time of about 15 minutes, hydrogen is admitted to the hollow body through the gas inlet tube with increasing pressure until the first gas bubbles are observed at the diaphragm, i.e., gas passes through the diaphragm.

The results obtained in these investigations on diaphragms with different coating densities with potassium titanate are summarized in the following Table.

| Potassium Titanate $(mg/cm^2)$ | PTFE $(mg/cm^2)$ | SB $(mg/cm^2)$ | "Bubble Point" (bar) |
|---|---|---|---|
| 27 | 2.1 | 2.3 | 4.1 |
| 22 | 1.8 | 1.9 | 4.0 |
| 18 | 1.4 | 1.6 | 2.2 |

EXAMPLE III

Determination of the Permeability

The arrangement described above likewise serves to determine the permeability of the diaphragms to electrolyte liquid or water. In this case, water is fed under pressure to the hollow body through the gas inlet tube. The pressure is generated here by a water column of 88.7 cm in a burette. The permeability is determined by the amount of water passing through the diaphragm (area: 12.6 $cm^2$). In these investigations, the high permeability of 400 $cm^3/cm^2 \cdot h \cdot$ bar is found.

EXAMPLE IV

Determination of the Electrochemical Properties

The electrochemical properties of the diaphragms according to the invention are tested in a half-cell with fixed Luggin capillary, an Hg/HgO-element serving as the reference electrode. 6 m KOH is used as the electrolyte liquid and the operating temperature is 80° C. The diaphragms serve as cover layers for oxygen electrodes. The electrode material for the reaction of the oxygen is a doped silver catalyst and the operating pressure of the oxygen is 2 bar.

In the investigations it was found that the ohmic portion of the resistance between the oxygen electrode and the Luggin capillary, which is determined with a milliohmmeter, is 250 mohm. If an asbestos diaphragm is used, a value of 210 mohm is obtained. It would seem that the increase of the resistance by 40 mohm, if a potassium titanate diaphragm is used, can be ascribed essentially to the voltage drop at its support screen. If the potentials of the oxygen electrode are compared, it is found that the IR-corrected values for potassium titanate and asbestos diaphragms are nearly identical.

What is claimed is:

1. A method for the manufacture of a diaphragm of fibrous potassium titanate and a non-fibrous organic binder therefor, for an electrochemical cell, which comprises:
   a. forming a suspension of said fibrous potassium titanate and from about 10 to about 30% by weight, based upon the weight of said fibrous potassium titanate, of said non-fibrous organic binder comprising from about 30 to 60% polytetrafluoroethylene and from about 40 to 70% styrene-butadiene copolymer, percents by weight of the organic binder; and
   b. applying said suspension to an alkali-resistant plastic or metal screen having a mesh width of between about 0.1 and 0.4 mm to deposit the components of said suspension thereon.

2. The method according to claim 1 wherein said screen has a mesh width of about 0.2 mm.

3. The method according to claim 1 wherein said screen comprises nickel.

4. A diaphragm for an electrochemical cell comprising an alkali-resistant plastic or metal screen having a mesh width of between about 0.1 and 0.4 mm and having coated thereon an admixture of fibrous potassium titanate and from about 10 to 30% by weight, based upon the weight of said potassium titanate of a non-fibrous organic binder comprising from about 30 to 60% polytetrafluoroethylene and 40 to 70% styrene-butadiene copolymer, percents by weight of said binder.

5. The diaphragm according to claim 4 wherein said content is from about 15% to 25% by weight.

6. The diaphragm according to claim 4 wherein the coating density of said potassium titanate is between about 10 and 30 $mg/cm^2$.

7. The diaphragm according to claim 6 wherein said coating density of potassium titanate is between about 15 and 25 $mg/cm^2$.

* * * * *